(12) United States Patent
Ojala et al.

(10) Patent No.: US 10,449,694 B2
(45) Date of Patent: Oct. 22, 2019

(54) PRODUCTION OF HIGH PERFORMANCE THERMOPLASTIC COMPOSITES

(71) Applicant: Teknologian tutkimuskeskus VTT Oy, Espoo (FI)

(72) Inventors: Antti Ojala, Tampere (FI); Kalle Nättinen, Tampere (FI); Lisa Wikström, Tampere (FI); Hannu Minkkinen, Espoo (FI); Petri Jetsu, Espoo (FI); Jani Lehmonen, Jyväskylä (FI); Karita Kinnunen, Espoo (FI); Tuomo Hjelt, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 565 days.

(21) Appl. No.: 15/028,441

(22) PCT Filed: Oct. 9, 2014

(86) PCT No.: PCT/FI2014/050769
§ 371 (c)(1),
(2) Date: Apr. 11, 2016

(87) PCT Pub. No.: WO2015/052382
PCT Pub. Date: Apr. 16, 2015

(65) Prior Publication Data
US 2016/0229088 A1  Aug. 11, 2016

(30) Foreign Application Priority Data

Oct. 9, 2013 (FI) ..................................... 20136006
Mar. 20, 2014 (FI) ..................................... 20145262

(51) Int. Cl.
| | | |
|---|---|---|
| D21H 17/35 | (2006.01) |
| B29B 11/16 | (2006.01) |
| B29C 51/12 | (2006.01) |
| C08J 9/00 | (2006.01) |
| C08J 9/30 | (2006.01) |
| B29C 44/20 | (2006.01) |
| B29C 51/14 | (2006.01) |
| D21H 17/23 | (2006.01) |
| D21H 17/28 | (2006.01) |
| D21H 21/56 | (2006.01) |
| B29C 48/00 | (2019.01) |
| B29C 43/00 | (2006.01) |
| B29K 29/00 | (2006.01) |
| B29K 105/00 | (2006.01) |
| B29K 105/04 | (2006.01) |
| B29K 105/08 | (2006.01) |
| B29K 201/00 | (2006.01) |

(52) U.S. Cl.
CPC .............. *B29B 11/16* (2013.01); *B29C 44/20* (2013.01); *B29C 48/0017* (2019.02); *B29C 51/12* (2013.01); *B29C 51/145* (2013.01); *C08J 9/0061* (2013.01); *C08J 9/0085* (2013.01); *C08J 9/30* (2013.01); *D21H 17/23* (2013.01); *D21H 17/28* (2013.01); *D21H 17/35* (2013.01); *D21H 21/56* (2013.01); *B29C 43/003* (2013.01); *B29K 2023/06* (2013.01); *B29K 2029/04* (2013.01); *B29K 2105/0005* (2013.01); *B29K 2105/04* (2013.01); *B29K 2105/0872* (2013.01); *B29K 2201/08* (2013.01); *B29K 2201/12* (2013.01); *B29K 2201/14* (2013.01); *C08J 2201/026* (2013.01)

(58) Field of Classification Search
USPC .......................................................... 162/102
See application file for complete search history.

(56) References Cited

U.S. PATENT DOCUMENTS

| | | |
|---|---|---|
| 5,853,538 A | 12/1998 | Reiner |
| 6,756,114 B2 | 6/2004 | Cichocki et al. |
| 2002/0117768 A1 | 8/2002 | Laine et al. |
| 2006/0099393 A1 | 5/2006 | Woodman et al. |
| 2008/0261019 A1 | 10/2008 | Shen et al. |
| 2008/0295985 A1 | 12/2008 | Moncla et al. |
| 2013/0101822 A1 | 4/2013 | Kunal et al. |

FOREIGN PATENT DOCUMENTS

| | | |
|---|---|---|
| FI | 20061049 A | 12/2007 |
| FR | 2932511 A1 | 12/2009 |
| WO | WO0208316 A1 | 1/2002 |
| WO | WO201268563 A2 | 12/2012 |

*Primary Examiner* — Mark Halpern
(74) *Attorney, Agent, or Firm* — Seppo Laine Oy

(57) ABSTRACT

The present invention concerns a process for producing a thermoformable porous web using a mixture of cellulosic fibers and one or more thermoplastic materials, particularly by foam forming said mixture into a composite foam, and applying the foam into one or more layers on a support to obtain a porous pre-form web. The thus produced porous composite web can be further processed by compression molding to give a rigid high-strength composite structure, which is suitable for use in producing, e.g. panels or plates, packages or hygiene products, insulators or filters, or printed intelligence, electronics or microcellulose products.

11 Claims, No Drawings

PRODUCTION OF HIGH PERFORMANCE THERMOPLASTIC COMPOSITES

This application is a 371 of PCT/FI2014/050769 filed on 9 Oct. 2019

BACKGROUND OF THE INVENTION

Field of the Invention

The present invention concerns a process for producing porous preform webs from cellulosic fibres and thermoplastic materials by foam forming, and a process for moulding these composite foams into the desired rigid structures.

Description of Related Art

Rigid moulded structures are commonly manufactured from composites, due to the strength, light weight and low costs of these. Polymer composites include fibre-reinforced polymeric materials. The polymer component can be a thermoset or a thermoplastic component. The reinforcement, in turn, typically consists of glass fibres, carbon fibres, cellulose (such as wood fibre, flax or hemp) or high strength polymers.

The existing solutions are produced, for example by using fibrillated polymers, typically polylactic acid (PLA), or a synthetic thermoplastic polymer, such as polypropylene (PP), and a woven or non-woven fibre web, or a glass-fibre or agrofibre web.

FR 2932511 A utilizes one of these typical polymer types, polylactic acid (PLA), in forming a fibrous structure that traps natural fibres into a 3-dimensional network. The obtained material is shaped into thermal insulation panels by blending the components, e.g. by extrusion, followed by casting them onto a suitable support and carrying out a heat treatment to cause adhesion to seal the structure. Using this procedure, only sheet-like structures can be obtained.

A more versatile and thus preferred moulding technique for such reinforced thermoplastics is injection moulding. Utilization of composites with high cellulose content in structural solutions is, however, challenging by both injection moulding and extrusion due to the fibre damage and the resulting degenerated product performance commonly caused by this technique in these materials.

If lignin would be used as a thermoplastic component in composites, said problem would be emphasized due to the low molecular weight of the lignin, and the high viscosity of the resulting composite. Thus, lignin composites with high cellulose contents are not common.

U.S. Pat. No. 6,756,114 B instead relates to a composite formed from synthetic cellulose fibres and a synthetic thermoplastic polymer, which is pelletized before moulding. According to this publication, the moulding can be carried out either by injection moulding or compression moulding. The pelletizing procedure, however, includes a step that resembles extrusion or coating, and constitutes quite an extensive pre-treatment, yet without providing a homogeneous mixture of fibre and polymer.

US 2006/099393 relates to a composite formed of natural cellulose fibres and a thermoplastic resin. The natural fibres and the thermoplastic are dispersed in an aqueous medium.

Södra Cell is, in turn, marketing a composite material called DuraPulp (see http://www.sodra.com/en/pulp/pulp_products/Composite-material/DuraPulp/), which includes wood fibres and polylactic acid (PLA). The material can be wet-formed and moulded, but this requires the use of high water-contents, which in turn results in high energy consumption during the drying step. Further, these wet-forming techniques do not allow the use of light thermoplastic polymers (lighter than water) in powder or granulate form. Additionally, the wet-formed structure is relatively dense, resulting in limited compression mouldability.

Thus, there exists a need for processes that can provide high-strength cellulosic composite structures without requiring extensive pre-treatments or high water contents, while being easy to process with conventional heat-moulding techniques, such as compression moulding.

SUMMARY OF THE INVENTION

It is an object of the present invention to provide an efficient process for forming porous thermoformable webs of cellulosic fibres and thermoplastic materials.

It is a further object of the invention to provide a process for moulding these porous thermoformable webs into high-strength composite structures.

Particularly, it is an object of the invention to provide such structures using composites with high contents of cellulosic fibres, compared to structures that can be produced with the help of conventional injection moulding techniques.

These and other objects, together with the advantages thereof over known methods and structures, are achieved by the present invention, as hereinafter described and claimed.

It has recently been discovered by the inventors that mouldable forms of thermoplastics can be manufactured utilizing foam forming to produce non-woven fabrics. These can be further processed, e.g. by compression moulding, into structures with high tensile stiffness and strength, as well as high impact strength.

The present invention concerns a process for producing a thermoformable porous web using a mixture of cellulosic fibres and one or more thermoplastic materials.

Instead of compounding, foam forming or foam laid forming is used, whereby fibre degradation is minimal contrary to compounding and extrusion, as virtually no shear forces are subjected to the fibres in the pre-processing. Further, using foam forming, porous preform webs are obtained, which can be subsequently compressed e.g. to double concave forms applying deformation above 15%.

By using foam-laid forming, porous prepreg webs are obtained, which can be subsequently compressed e.g. to double concave forms applying deformation above 15% and/or diced into fibre pellets.

Additional performance gain can optionally be obtained by applying covalent crosslinking agent to the composition prior to compression moulding.

More specifically, the process for producing a thermoformable porous web of the present invention is characterized by what is stated in the characterizing part of Claim 1.

Further, the thus produced web is characterised by what is stated in Claim 10, the process for producing a composite structure of the present invention is characterised by what is stated in the characterising part of Claim 13, the process for producing thermoplastic-cellulosic fibre prepregs is characterized by what is stated in the characterising part of Claim 16 and the further use of the processes of the invention in various applications is characterised by what is stated in Claim 17.

A process for producing a thermoformable porous prepreg web of the present invention is characterized by what is stated in the characterizing part of Claim 18.

Further, the thus produced web is characterized by what is stated in Claim 26, the process for producing a composite structure of the present invention is characterized by what is stated in the characterising part of Claim 28, Considerable advantages are obtained by means of the invention. For example, the present invention provides a process that can be used to form structures with high tensile stiffness and strength, as well as high impact strength.

Further, the process enables the use of high fibre content, and high melt viscosity thermoplastics, which cannot be processed by injection moulding or extrusion.

The present invention encompasses also the manufacture of products from entirely renewable raw-materials, such as cellulosic fibres and lignin.

The present invention also enables production of thermoformable sheets in a continuous, easily up-scalable, manner that enables economics of scale, and enables the production of fibre materials with significantly lower cost compared to the production of existing non-woven fibre webs.

Particularly, the present foaming process is more cost efficient than the existing wet-forming or wet-laid forming processes due to the much lower water consumption. The thermoplastic matrix can still be applied in powder or pellet form instead of as fibres, which provides a significant further reduction in the processing costs.

Next, the invention will be described more closely with reference to a detailed description.

DETAILED DESCRIPTION OF EMBODIMENTS OF THE INVENTION

The present invention concerns a process for producing a thermoformable porous web using a mixture of cellulosic fibres and one or more thermoplastic materials by foam forming said mixture into a composite foam, applying it on a wire, and optionally drying it to obtain a porous pre-form web.

The term "thermoformable" is intended to describe a solid material (here in the form of a web) that can be softened and thus moulded into a desired shape when heated to a temperature that softens the thermoplastic material contained therein. The pre-form webs of the present invention can be heated using typical methods (hot air, infra-red (IR), contacts) that are used for traditional thermoplastic nonwoven and woven materials. Alternatively, they can be pre-heated, as a result of the drying step following the application of the composite foam onto the wire. In such a case, no separate heating is required during moulding. When cooling the softened material, it again solidifies, thus maintaining the shape it obtained when applied into the mould.

The cellulosic fibres can be fibres of pure cellulose or of cellulose derivatives, such as cellulose acetate (CA), cellulose acetate butyrate (CAB), cellulose acetate phthalate (CAP) or cellulose carbamate (CCA) fibres, although pure cellulose fibres are preferred. For the purposes of the present invention, pure cellulose fibres are e.g. fibres that have been obtained from sources comprising cellulose fibres. The sources comprising cellulose fibres undergo extensive purification before pure cellulose is obtained. The fibres can be natural or synthetic (i.e. artificial, but preferably still obtained from natural sources), the most typical synthetic cellulose fibres being rayon or viscose fibres. These cellulosic fibres are most suitably macrofibres, and can be of various origin and form, such as fibres originating from paper or board pulp obtained from chemical, mechanical, thermomechanical or chemi-thermomechanical pulping, or originating from recycled pulp, preferably selected from thermo-mechanical pulp (TMP) or hot-water-extracted pulp (HWE), or other similar pulps, optionally being bleached. The wood pulp can be obtained from hardwood or softwood trees, preferred sources including acacia, aspen, birch, eucalyptus, maple, pine and spruce.

Alternatively or additionally, cellulosic fibres of agricultural origin, such as jute, hemp, flax, ramie, cotton and kenaf, can be employed.

One or more thermoplastic material can be used, typically in pellet form, finely ground or fibrillated. Suitable thermoplastics are bioplastics, such as polylactic acid (PLA) and polyglycolic acid (PGA), or thermoplastic starch, or native starch, or lignin, and their derivatives, as well as polyolefins, polyamides, polyvinyl chloride (PVC), polyvinyl alcohol (PVA), polyesters (e.g. polyethylene terephthalate, PET), polycarbonate (PC), thermoplastic polyurethane (TPU), polyphenylene sulphide (PPS), polyetherimide (PEI), and polystyrenes, such as acrylonitrile-butadiene-styrene (ABS). Said bioplastics, starch and lignin (or their derivatives, such as starch acetate) are preferred, while lignin is particularly preferred, as it enables the production of entirely renewable composites.

The preferred lignin can be either native lignin (primarily kraft, but also alkali based or hot-water-extracted lignin or organosolv lignin or a chemically modified lignin (e.g. acetylated, hydroxypropylated or palmitated). The lignin can be obtained by separating it from various biomasses, particularly from the pulps of the paper industry. Thus, according to one option of the present invention, the cellulosic fibres and the lignin (when used as a thermoplastic material of the invention) can be obtained from the same source, e.g. from wood pulp.

The content of cellulosic fibres in the mixture or composition forming the composite foam (or the porous pre-form web) is preferably 20-90 w-%, more preferably 30-85 w-%, and most suitably 40-80 w-%, whereas the content of thermoplastic(s) in the mixture or composition preferably is 10-80 w-%, more preferably 15-70 w-%, and most suitably 20-60 w-%.

To enhance the strength properties of the final moulded structures, various compatibilisers, such as polypropylene-maleic anhydride (PP-MAH), can be mixed with the thermoplastic material before the foam forming process. Compatibilisers can be also added to the fibre-thermoplastic mixture before, during or after the foaming, or alternatively or additionally, cellulosic additives, such as microfibrillated cellulose (MFC) or nanofibrillated cellulose (NFC, also called nanocellulose). Also an increased amount of synthetic cellulose macro-fibres enhances the strength of the moulded structures.

Also chemical modification of the fibres can be used to improve compatibility of fibres and the thermoplastic polymer(s), particularly covalent modification. Examples of such chemical modifications that are suitable for use in the present invention are alkali treatment, esterification and silane treatments.

The third option to improve the compatibility of the fibres and the thermoplastic polymers is to use surfactants such as alkyl ketene dimer (AKD) or alkenyl succinic anhydride (ASA), which can be reacted with cellulose polymer in water dispersion.

Optionally, one or more cross-linking agent can be added, preferably by adding into the thermoplastic component before mixing with the cellulosic fibres, into the mixture during the foam forming (i.e. while supplying the aqueous cellulose-thermoplastics slurry with air), or by spraying onto the pre-form web or by impregnating into to the web. The use of such cross-linking agent(s) is particularly preferred when two or more layers of the composite foam are used to produce the thermoformable web.

The optional cross-linking agent(s) can be selected so as to activate only in the compression moulding temperature. Possible cross-linking agents include reagents with bis-epoxy functionalities, maleic anhydride (MAH) together with peroxide, peroxide alone, as well as commercial additives, such as styrene acrylic resins (including those named Joncryl).

According to a preferred embodiment of the invention, a cellulose-lignin composition is used to produce the pre-form web or composite structure, since it is entirely renewable. In this composition, lignin forms at least the main part of the thermoplastic material (i.e. at least 50%). To enhance the strength properties of this pre-form web or composite structure, cellulosic additives, such as microfibrillated cellulose (MFC) or nanofibrillated cellulose (NFC, also called nanocellulose), further thermoplastics or plasticizers can be added, preferably in the foam forming stage of the production process.

The foam forming stage of the present process is preferably carried out by adding water to the mixture of the fibre and the thermoplastic(s), preferably in a small amount that gives an aqueous mixture with a relatively high consistency of 0.5 to 15 w-%, and adding one or more foaming agent. Compared to wet-forming processes, the required amount of water is very small. Said foaming agent, in addition to facilitating the foam forming, further decreases the required amount of water. A typical amount of foaming agent, required to obtain a foam of a suitable consistency is 0.01-0.2 wt-%. The suitable amount, however, depends largely on the choice of foaming agent.

Additionally, the foaming process can be facilitated by supplying additional air into the slurry.

Preferably, the foam forming results in a composite foam having an air content in the range of 55 to 80 vol-%, and preferably containing from 0.1 to 15 w-% dry matter.

The term "foam" is intended to cover slurries that contain air bubbles in a content of at least 50 vol-% of the slurry. When such a foam is applied into one or more layers on a supporting wire, a web is obtained, which still contains more air than conventionally formed wet-laid webs. Thus, the bubbles in the web formed by foam forming give this web its "porous" character.

More precisely, the slurry can be made up by mixing the fibres and the thermoplastics with water or foaming agent (or both) using, e.g. a stirring equipment, preferably into a consistency of 0.5 to 15 w-%, most suitably into a consistency of 0.5 to 5 w-%. A suitable consistency depends also on the ratio of fibre to thermoplastic, whereby said consistency values are particularly related to a ratio of 1.5/1 (fibre/thermoplastic).

The foaming agent can be added to the slurry before supplying the air, thus facilitating the foaming of the relatively dry slurry, examples of suitable agents being sodium dodecyl sulphate (SDS), hexadecyl trimethyl ammonium bromide (HTAB) and polyvinyl alcohol (PVA).

Foam forming technology requires significantly less water compared to conventional manufacturing of nonwoven materials, such as paper products. The obtained foam contains large amounts of air, providing better opportunities for influencing the properties of the end-products. Foam forming technology also reduces the energy consumption by reducing the amount of water that needs to be filtered or evaporated.

Due to the foaming, the material of the invention does not require compounding. Instead, the composite mixture can be foamed and applied onto a wire as a porous pre-form web.

The present invention also concerns such a thermoformable porous web, which can be produced e.g. as described above, and which consists of a composite foam (formed from a mixture or composition containing cellulosic fibres and a thermoplastic material) applied onto a wire, and at least partially dried.

The obtained foamed material, preferably in the form of a web, can then be moulded according to the invention, using the present process for producing a moulded structure, particularly by compression moulding, preferably at a temperature of 120-240° C.

For example, the foamed material can be pre-heated, e.g. using a hot stream of air or infra-red radiation (IR), and subsequently be compressed between cold or heated moulds. According to another exemplary alternative, the material can be compressed directly between hot moulds, without pre-heating.

Alternatively, the pre-form web, in continuous form, can be inline moulded by compression moulding, or by moulding using vacuum forming, or by another similar procedure, using a customised forming roll to obtain a desired shape. Further this shaped web can be die cut into products such as packaging boxes (e.g. egg cartons), insulation panel components or similar.

Further, multiple layers of the pre-form web, in dried form, can be applied on top of each other to provide a multilayer web, i.e. before the moulding step is carried out, whereby the final structure will be a multilayered moulded structure.

The foam forming process of the present invention can be carried out using similar equipment as traditionally used for production of foam formed nonwoven webs with cellulosic fibres. The equipment typically contains:
  a foam forming unit,
  a supporting wire on which the foam is drained to form a web, and
  a drying unit (e.g. cylinder dryer or oven).
Additionally a moulding unit is required to produce the moulded structures.

Such equipment provides the possibility to carry out all of the present processes continuously, particularly when arranging the support wire in the form of a moving belt.

The moulded structures obtained using the process of the present invention can be used for various purposes, some typical examples including the production of conventional moulded structures (similar to traditional thermoplastic nonwoven materials), such as panels and plates that are used in automotive, furniture, packaging and construction industry. However, the foam forming technology makes it possible to provide a more versatile range of end-products, due to the highly porous, light-weight and smooth characteristics of the products. Thus, further examples of end-products include hygiene products, insulators and filters, as well as even printed intelligence, electronics and microcellulose applications.

In an embodiment, the process for producing a thermoformable porous web uses a mixture of cellulosic fibres and one or more thermoplastic materials, said mixture is foam-laid formed into a composite foam, applied on a wire and optionally dried to obtain a porous prepreg web.

"Prepreg" is a term for "pre-impregnated" composite fibre webs, wherein a matrix material is already present.

As has been described in embodiments above, the cellulosic fibres can be fibres of pure cellulose or of cellulose derivatives, such as cellulose acetate (CA), cellulose acetate butyrate (CAB), cellulose acetate phthalate (CAP) or cellulose carbamate (CCA) fibres, although pure cellulose fibres are preferred. For the purposes of the present invention, pure cellulose fibres are e.g. fibres that have been obtained from sources comprising cellulose fibres. The sources comprising cellulose fibres undergo extensive purification before pure cellulose is obtained. The fibres can be natural or synthetic (i.e. artificial, but preferably still obtained from natural sources), the most typical synthetic cellulose fibres being rayon or viscose fibres. These cellulosic fibres are most suitably macrofibres, and can be of various origin and form, such as fibres originating from paper or board pulp obtained from chemical, mechanical, thermomechanical or chemi-thermomechanical pulping, or originating from recycled pulp, preferably selected from thermo-mechanical pulp (TMP) or hot-water-extracted pulp (HWE), or other similar pulps, optionally being bleached. The wood pulp can be obtained from hardwood or softwood trees, preferred sources including acacia, aspen, birch, eucalyptus, maple, pine and spruce.

Alternatively or additionally, cellulosic fibres of agricultural origin, such as jute, hemp, flax, ramie, cotton and kenaf, can be employed.

One or more thermoplastic material can be used, typically in pellet form, finely ground or fibrillated. Suitable thermoplastics are bioplastics, such as polylactic acid (PLA) and polyglycolic acid (PGA), or thermoplastic starch, or native starch, or lignin, and their derivatives, as well as polyolefins, polyamides, polyvinyl chloride (PVC), polyvinyl alcohol (PVA), polyesters (e.g. polyethylene terephthalate, PET), polycarbonate (PC), thermoplastic polyurethane (TPU), polyphenylene sulphide (PPS), polyetherimide (PEI), and polystyrenes, such as acrylonitrile-butadiene-styrene (ABS). Said bioplastics, starch and lignin (or their derivatives, such as starch acetate) are preferred, while lignin is particularly preferred, as it enables the production of entirely renewable composites.

The preferred lignin can be either native lignin (primarily kraft, but also alkali based or hot-water-extracted lignin or organosolv lignin or a chemically modified lignin (e.g. acetylated, hydroxypropylated or palmitated). The lignin can be obtained by separating it from various biomasses, particularly from the pulps of the paper industry. Thus, according to one option of the present invention, the cellulosic fibres and the lignin (when used as a thermoplastic material of the invention) can be obtained from the same source, e.g. from wood pulp.

When a porous prepreg web is to be formed, the content of cellulosic fibres in the mixture or composition forming the composite foam (or the porous prepreg web) is preferably 10-70 w-%, whereas the content of thermoplastic(s) in the mixture or composition is preferably 30-90 w-%.

To be more precise, when the foam or prepreg web is designed to be used in compression moulding the content of cellulosic fibres in the mixture or composition is preferably 20-90 w-%), more preferably 30-85 w-%, and most suitably 40-80 w-%, whereas the content of thermoplastic(s) in the mixture or composition preferably is 10-80 w-%, more preferably 15-70 w-%), and most suitably 20-60 w-%. Alternatively, when the foam or web is designed to be used in extrusion processes (e.g. in the form of pellets) the content of cellulosic fibres in the mixture or composition is preferably 50-80 w-%, whereas the content of thermoplastic(s) in the mixture or composition preferably is 20-50 w-%

To enhance the strength properties of the final moulded structures, various compatibilisers, such as polypropylene-maleic anhydride (PP-MAH), can be mixed with the thermoplastic material before the foam-laid forming process. Compatibilisers can be also added to the fibre-thermoplastic mixture before, during or after the foaming, or alternatively or additionally, cellulosic additives, such as microfibrillated cellulose (MFC) or nanofibrillated cellulose (NFC, also called nanocellulose). Also an increased amount of synthetic cellulose macro-fibres enhances the strength of the moulded structures.

Also chemical modification of the fibres can be used to improve compatibility of fibres and the thermoplastic polymer(s), particularly covalent modification. Examples of such chemical modifications that are suitable for use in the present invention are alkali treatment, esterification and silane treatments.

The third option to improve the compatibility of the fibres and the thermoplastic polymers is to use surfactants such as alkyl ketene dimer (AKD) or alkenyl succinic anhydride (ASA), which can be reacted with cellulose polymer in water dispersion.

Optionally, one or more cross-linking agent can be added, preferably by adding into the thermoplastic component before mixing with the cellulosic fibres, into the mixture during the foam forming (i.e. while supplying the aqueous cellulose-thermoplastics slurry with air), or by spraying onto the prepreg web or by impregnating into to the web. The use of such cross-linking agent(s) is particularly preferred when two or more layers of the composite foam are used to produce the thermoformable web.

The optional cross-linking agent(s) can be selected so as to activate only in the compression moulding temperature. Possible cross-linking agents include reagents with bis-epoxy functionalities, maleic anhydride (MAH) together with peroxide, peroxide alone, as well as commercial additives, such as styrene acrylic resins (including those named Joncryl).

According to a preferred embodiment of the invention, a cellulose-lignin composition is used to produce the prepreg web or composite structure, since it is entirely renewable. In this composition, lignin forms at least the main part of the thermoplastic material (i.e. at least 50%). To enhance the strength properties of this prepreg web or composite structure, cellulosic additives, such as microfibrillated cellulose (MFC) or nanofibrillated cellulose (NFC, also called nanocellulose), further thermoplastics or plasticizers can be added, preferably in the foam forming stage of the production process.

The foam generation stage of the present process is preferably carried out by adding water to the mixture of the fibre and the thermoplastic(s), preferably in a small amount that gives an aqueous mixture with a relatively high consistency of 0.5 to 15 w-%, and adding one or more foaming agent. Compared to wet-laid forming processes, the required amount of water is very small. Said foaming agent, in addition to facilitating the foam-laid forming, further decreases the required amount of water. A typical amount of foaming agent, required to obtain a foam of a suitable consistency is 0.01-0.2 wt-%. The suitable amount, however, depends largely on the choice of foaming agent.

Additionally, the foaming process can be facilitated by supplying additional air into the slurry.

Preferably, the foam-laid forming results in a composite foam having an air content in the range of 55 to 80 vol-%, and preferably containing from 0.1 to 15 w-% dry matter.

The term "foam" is intended to cover slurries that contain air bubbles in a content of at least 50 vol-% of the slurry. When such foam is applied into one or more layers on a supporting wire, a web is obtained, which still contains more air than conventionally formed wet-laid webs. Thus, the bubbles in the web formed by foam-laid forming give this web its "porous" character.

More precisely, the slurry can be made up by mixing the fibres and the thermoplastics with water or foaming agent (or both) using, e.g. a stirring equipment, preferably into a consistency of 0.5 to 15 w-%, most suitably into a consistency of 0.5 to 5 w-%. A suitable consistency depends also on the ratio of fibre to thermoplastic, whereby said consistency values are particularly related to a ratio of 1.5/1 (fibre/thermoplastic).

The foaming agent can be added to the slurry before supplying the air, thus facilitating the foaming of the relatively dry slurry, examples of suitable agents being sodium dodecyl sulphate (SDS), hexadecyl trimethyl ammonium bromide (HTAB) and polyvinyl alcohol (PVA).

Foam-laid forming technology requires significantly less water compared to conventional manufacturing of nonwoven materials, such as paper products. The obtained foam contains large amounts of air, providing better opportunities for influencing the properties of the end-products. Foam forming technology also reduces the energy consumption by reducing the amount of water that needs to be filtered or evaporated.

Due to the foaming, the material of the invention does not require compounding. Instead, a homogenous composite mixture can be formed and applied onto a wire as a porous prepreg web.

The present invention also concerns such a thermoformable porous web, which can be produced e.g. as described above, and which consists of a composite foam (formed from a mixture or composition containing cellulosic fibres and a thermoplastic material) applied onto a wire, and at least partially dried.

The obtained foamed material, preferably in the form of a web or a sheet, can then be moulded according to the invention, using the present process for producing a moulded structure, particularly by compression moulding, preferably at a temperature of 120-240° C.

For example, the foamed material can be pre-heated, e.g. using a hot stream of air or infra-red radiation (IR), and subsequently be compressed between cold or heated moulds. According to another exemplary alternative, the material can be compressed directly between hot moulds, without pre-heating.

Alternatively, the prepreg web, in continuous form, can be inline moulded by compression moulding, or by moulding using vacuum forming, or by another similar procedure, using a customised forming roll to obtain a desired shape. Further this shaped web can be die cut into products such as packaging boxes (e.g. egg cartons), insulation panel components or similar.

Further, multiple layers of the prepreg web, in dried form, can be applied on top of each other to provide a multilayer web, i.e. before the moulding step is carried out, whereby the final structure will be a multi-layered moulded structure.

The foam forming process of the present invention can be carried out using similar equipment as traditionally used for production of foam-laid formed nonwoven webs with cellulosic fibres. The equipment typically contains:
a foam generation unit,
a supporting wire on which the foam is drained to form a web,
a pressing unit to control the solid content and the porosity of the web,
a unit to wind the web into a roll and
a drying unit (e.g. cylinder dryer or oven).

Additionally a moulding unit is required to produce the moulded structures.

Such equipment provides the possibility to carry out all of the present processes continuously, particularly when arranging the support wire in the form of a moving belt.

The moulded structures obtained using the process of the present invention can be used for various purposes, some typical examples including the production of conventional moulded structures (similar to traditional thermoplastic nonwoven materials), such as panels and plates that are used in automotive, furniture, packaging and construction industry. However, the foam-laid forming technology makes it possible to provide a more versatile range of end-products, due to the highly porous, light-weight and smooth characteristics of the products. Thus, further examples of end-products include hygiene products, insulators and filters, as well as even printed intelligence, electronics and microcellulose applications.

According to another preferred embodiment of the present invention, the obtained foamed material, preferably in the form of a web or a sheet, is chopped into smaller particles by a compacting method(s) such as pelletizing. The produced fibre sheets are chopped and pelletized or cut into small pieces. The pelletizing process can be applied onto existing foam laid forming lines with only minor changes, making the process more economical, by adding a compacting/dicing device to the end of the foam laid forming line and thus providing continuous production of fibre pellets.

Thus, according to an embodiment of the present invention, the process of preparing fibre-polymer prepregs includes the following steps:

Option A:
foaming thermoplastic material(s) with cellulosic fibres to obtain a foamed material (as described earlier in the description),
draining the foamed material to a solid consistency of 30-70 weight-% on a wire,
compacting the web to pellets, and
drying the pellets with heat.

According to one preferred embodiment of the present invention, the web is compacted into pellets having an average size of 0.2 mm-40 mm (width) and 0.2 mm-40 mm (length), more preferably 0.2 mm-10 mm (width) and 0.5 mm-20 mm (length).

Option B:
foaming thermoplastic material(s) with cellulosic fibres to obtain a foamed material (as described earlier in the description),
draining the foamed material on a wire, pressing the web to desired solid content and porosity and then drying the web with heat,
cutting the compressed web to smaller mats and piling the mats, and
dicing the mats to smaller pieces.

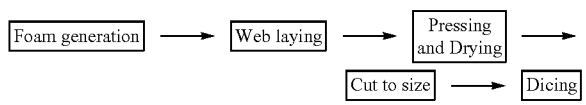

Option C:
  foaming thermoplastic material(s) with cellulosic fibres to obtain a foamed material (as described earlier in the description),
  draining the foamed material on a wire, pressing the web to desired solid content and porosity and then drying the web with heat, and
  winding the web into a roll.

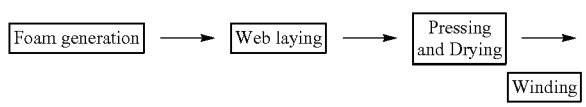

EXAMPLES

Example 1—Foam Forming of Composites Containing Cellulose Fibres and a Thermoplastic Polymer Cellulose fibres obtained from bleached pine pulp were mixed with a polyethylene matrix in powder form, to give a 50/50 ratio of fibre/polymer. Then water was added to the mixture until the consistency of 3.8% was reached. Sodium dodecyl sulphate (SDS) was added, whereafter foaming of the mixture was achieved by stirring at high speed (3000 rpm) and using a mixing element providing efficient axial flow.

The obtained foam was first drained on a wire and subsequently oven dried at 70° C. to provide a nonwoven mat with a grammage of 1000 g/m$^2$. Two mats were layered and subsequently compression moulded between hot moulds (175° C.) into a plate having a grammage of 2000 g/m$^2$. Pure polyethylene matrix and pure foam formed pine pulp webs were used as references.

The tensile strength, the modulus and the strain at break of these structures were measured, and the results are shown in the below Table 1.

TABLE 1

Composition and strength of fibre/polymer structures.

| Sample | Grammage (g/m$^2$) | Fibre (%) | Matrix (%) | Matrix type | Foaming agent | Tensile str. (MPa) | Modulus (MPa) | Strain at break (%) |
|---|---|---|---|---|---|---|---|---|
| PE (ref. 1) | — | — | PE/100 | Powder | — | 12.5 | 21 | >200 |
| Fubre 6 (ref. 2) | 2000 | Pine pulp/100 | — | — | SDS | 1.8 | 12 | 30.7 |
| Fubre 3 | 2000 | Pine pulp/50 | PE/50 | Powder | SDS | 21.3 | 138 | 39.6 |

PE = Polyethylene
SDS = Sodium dodecyl sulphate

By using the present foam laid forming technology, it is possible to produce such homogenized mixture of thermoplastics and cellulosic fibres that the conventional melt-mixing step can be fully avoided and the materials produced, e.g. fibre pellets, can thus be directly used in the manufacture of composite parts by using injection moulding or extrusion techniques for various applications. Alternatively, the formed web can be directly wed from a roll into an extruder (option 3).

Compared to the existing water laid forming techniques the foam-laid forming technique enables utilization of materials that are lighter than water (e.g. polyolefins) in efficient way. Further advantage is that drying of the foam-laid formed webs/sheets needs substantially less energy than drying of the water formed webs/sheets.

The following non-limiting examples are intended merely to illustrate the advantages obtained with the embodiments of the present invention.

Example 2—Foam Forming Composites Containing Cellulose Fibres and Thermoplastic Lignin Cellulose fibres obtained from pine pulp were mixed with a polymer matrix in powder form, to give a 50/50 or 40/60 ratio of fibre/polymer. The polymer matrix consisted of a mixture of lignin (51%), starch acetate (29%) and triethyl citrate (20%). Polyvinyl alcohol (PVA) was added, whereafter foaming of the mixture was achieved by efficient stirring, as described in Example 1. The obtained foam was first dried on a wire and then oven dried at 70° C. resulting in a porous web with a varying grammage.

The obtained webs were compression moulded using hot moulds (185° C.) into a plate of varying grammage. Pure pine pulp fibres were used as a reference.

The tensile strength, the modulus and the strain at break of these structures were measured, and the results are shown in the below Table 2.

TABLE 2

Composition and strength of fibre/polymer structures.

| Sample | Grammage (g/m²) | Fibre (%) | Matrix (%) | Matrix type | Matrix grain size | Foaming agent | Tensile strength (MPa) | Modulus (GPa) | Strain at break (%) |
|---|---|---|---|---|---|---|---|---|---|
| Ref. | 200 | Pine pulp/100 | — | — | — | PVA2 | 7.2 | 0.75 | 8.6 |
| VR15 | 200 | Pine pulp/50 | FUMO65/50 | Powder | <0.8 mm | PVA2 | 20.8 | 0.86 | 12.2 |
| VR16-1 | 600 | Pine pulp/50 | FUMO65/50 | Powder | <1.0 mm | PVA2 | 51.1 | 2.48 | 58.6 |
| VR16-2 | 800 | Pine pulp/50 | FUMO65/50 | Powder | <1.0 mm | PVA2 | 61.4 | 0.39 | 66.7 |
| VR16-3 | 1000 | Pine pulp/50 | FUMO65/50 | Powder | <1.0 mm | PVA2 | 58.7 | 0.43 | 40.3 |
| VR18-1 | 750 | Pine pulp/40 | FUMO65/60 | Powder | <1.0 mm | PVA2 | 40.4 | 0.43 | 36.5 |
| VR18-2 | 1000 | Pine pulp/40 | FUMO65/60 | Powder | <1.0 mm | PVA2 | 60.4 | 0.56 | 27.6 |
| VR18-3 | 1250 | Pine pulp/40 | FUMO65/60 | Powder | <1.0 mm | PVA2 | 67.2 | 0.53 | 28.9 |
| VR27 | 900 | Pine pulp/50 | FUMO76/50 | Powder | <2.0 mm | PVA1 | 56 | 0.5 | 23.7 |
| JY3.1 | 1000 | Pine pulp/50 | FUMO76/50 | Powder | <2.0 mm | PVA1 | 30.0 | 0.27 | 22.53 |
| JY3.2 | 2000 | Pine pulp/50 | FUMO76/50 | Powder | <2.0 mm | PVA1 | 50.2 | 0.34 | 29.3 |

FUMO65/FUMO76 = Lignin (51%)/Starch acetate (29%)/TEC (20%),
TEC = Triethyl citrate
PVA2 = Mowiol 28-99,
PVA1 = Mowiol 44-88

The invention claimed is:

1. A process for producing a thermoformable porous web using cellulosic fibres and one or more thermoplastic materials by foam forming a mixture of the cellulosic fibres and the thermoplastic material(s) into a composite foam, and applying the foam on a wire to obtain a porous pre-form web, wherein the cellulosic fibres are selected from fibres of pure cellulose or from fibres of cellulose derivatives, and wherein the one or more thermoplastic materials comprise lignin.

2. The process according to claim 1, further comprising obtaining the cellulosic fibres from wood pulp obtained from chemical, mechanical, thermomechanical or chemithermo-mechanical pulping, or from recycled pulp or from agricultural fibres, or from thermo-mechanical pulp (TMP) or hot-water-extracted pulp (HWE), optionally being bleached.

3. The process according to claim 1, wherein the thermoplastic material(s) further comprise a member from group consisting of polylactic acid (PLA), polyglycolic acid (PGA), polyolefins, polyamides, polyvinyl chloride (PVC), polyesters, polyvinyl alcohol (PVA), polycarbonate (PC), thermoplastic polyurethane (TPU), polyphenylene sulphide (PPS), polyetherimide (PEI), polystyrenes, thermoplastic or native starch, and derivatives of the above.

4. The process according to claim 1, wherein the content of cellulosic fibres in the composite foam is 20-90 w-%.

5. The process according to claim 1, wherein the content of thermoplastic material(s) in the composite foam is 10-80 w-%.

6. The process according to claim 1, further comprising carrying out the foam forming by adding water into the mixture of fibre and thermoplastic(s) by adding a foaming agent, and by stirring efficiently to give the composite foam.

7. The process according to claim 1, further comprising adding one or more compatibilizers into the thermoplastic component(s) before mixing with the cellulosic fibres, or into the mixture of the fibres and the thermoplastic material (s), or into the composite foam.

8. The process according to claim 1, further comprising adding one or more cross-linking agents into the thermoplastic component(s) before mixing with the cellulosic fibres, by adding the one or more cross-linking agents into the mixture during the foam forming, by spraying the one or more cross-linking agents onto the pre-form web, or by impregnating the one or more cross-linking agents into the web.

9. The process according to claim 1 further comprising producing thermoplastic-cellulosic fibre prepregs from the thermoformable porous web by one of the following steps:
   a. draining the web on a wire, compacting the web into pellets and drying the pellets, or
   b. draining the web on a wire, pressing the web to a desired solid consistency, drying the web, cutting the web to mats and dicing the mats to smaller particles, or
   c. draining the web on a wire, pressing the web to a desired solid consistency, drying the web and winding the web into a roll.

10. The process according to claim 9, comprising carrying out step a), wherein the web is first drained to a solid consistency of 30-70 weight-% on a wire and then compacted into pellets having an average size of 0.2 mm-40 mm (width) and 0.2 mm-40 mm (length), followed by drying the pellets.

11. The process according to claim 9, wherein a compacting, cutting or winding device is placed at the end of a foam laid forming line, thus enabling a continuous production process.

* * * * *